(12) United States Patent
Nagarajan et al.

(10) Patent No.: US 12,311,554 B2
(45) Date of Patent: May 27, 2025

(54) METHOD AND APPARATUS FOR DYNAMICALLY MODIFYING A REPRESENTATION OF AN AUTONOMOUS ROBOT

(71) Applicant: OMRON Corporation, Kyoto (JP)

(72) Inventors: Karthick Phillip Nagarajan, Pleasanton, CA (US); Thomas Fisher, Livermore, CA (US)

(73) Assignee: OMRON Corporation, Kyoto (JP)

( * ) Notice: Subject to any disclaimer, the term of this patent is extended or adjusted under 35 U.S.C. 154(b) by 303 days.

(21) Appl. No.: 18/051,463

(22) Filed: Oct. 31, 2022

(65) Prior Publication Data

US 2024/0139945 A1    May 2, 2024

(51) Int. Cl.
  *B25J 9/00*    (2006.01)
  *B25J 9/16*    (2006.01)
  *G05B 19/4155*    (2006.01)

(52) U.S. Cl.
  CPC ........ *B25J 9/1664* (2013.01); *G05B 19/4155* (2013.01); *G05B 2219/40269* (2013.01)

(58) Field of Classification Search
  CPC ... B25J 9/1664; B25J 9/1671; G05B 19/4155; G05B 2219/40269; G05B 2219/40298; G05B 19/41885
  See application file for complete search history.

(56) References Cited

U.S. PATENT DOCUMENTS

| | | | |
|---|---|---|---|
| 2016/0016311 A1* | 1/2016 | Konolige | ............... B25J 9/1664 901/30 |
| 2016/0063710 A1 | 3/2016 | Tanaka | |
| 2019/0039242 A1 | 2/2019 | Fujii et al. | |

OTHER PUBLICATIONS

International Search Report and Written Opinion received in International Application No. PCT/JP2023/036894, mailed Nov. 21, 2023, 8 pages.

* cited by examiner

*Primary Examiner* — Ian Jen
(74) *Attorney, Agent, or Firm* — Knobbe, Martens, Olson & Bear LLP

(57) ABSTRACT

A system for modifying a representation of a component is disclosed. The system can implement a process that obtains a first representation of a component and a second representation of the component. The system can build one or more intermediate representations of the component based on the component transitioning between the first representation and the second representation. The system can perform tasks, activities, movement, etc. based on the one or more intermediate representations. The system can share the one or more intermediate representations of the component with other components to avoid collisions with the other components. The system may include a networking program to stream the representations to a computing device. The computing device can include a networking program to receive the representations that are streamed from the system through its networking program and a user interface (UI) application to display the representations.

19 Claims, 6 Drawing Sheets

METHOD AND APPARATUS FOR DYNAMICALLY MODIFYING A REPRESENTATION OF AN AUTONOMOUS ROBOT

TECHNICAL FIELD

This disclosure generally relates to the dynamic modification of a representation of a robot, such as the dynamic modification of an outline of an autonomous robot.

BACKGROUND

Robots are used to perform and/or automate tasks. Robots can include a number of electronics that enable the robots to perform various actions. Computing devices can communicate with the robots and cause the robots to perform the tasks. The robots may perform the tasks based on a representation (e.g., a software representation) of the robots.

SUMMARY

One aspect of the present disclosure is a method for modifying a representation of a robot. The method may include obtaining a first representation of the robot corresponding to a first shape of the robot before a movement transition. The method may further include obtaining a second representation of the robot corresponding to a predicted second shape of the robot after the movement transition. The method may further include determining a first bounding box for the first representation. The method may further include determining a second bounding box for the second representation. The method may further include determining a first intermediate representation that has the same general shape as the second representation and scaled to fit within the first bounding box. The method may further include determining a plurality of additional intermediate representations that are incrementally scaled between the first intermediate representation and the second representation.

In another aspect of the present disclosure, the method may further include modifying movement of the robot based on one or more of the intermediate representations.

In another aspect of the present disclosure, the method may further include causing display of at least one of the first representation, the second representation, the first intermediate representation, or an intermediate representation of the plurality of additional intermediate representations.

In another aspect of the present disclosure, the method may further include causing display of a visualization identifying at least one of a transformation from the first representation to the first intermediate representation, a transformation from the first intermediate representation to the plurality of additional intermediate representations, or a transformation from the plurality of additional intermediate representations to the second representation.

In another aspect of the present disclosure, each of the first representation, the second representation, the first intermediate representation, and the plurality of additional intermediate representations may include a software representation of the robot.

In another aspect of the present disclosure, the robot may include an autonomous robot.

In another aspect of the present disclosure, each of the first representation, the second representation, the first intermediate representation, and the plurality of additional intermediate representations may include a polygon.

In another aspect of the present disclosure, the method may further include performing collision avoidance based on the first intermediate representation and the plurality of additional intermediate representations.

In another aspect of the present disclosure, the method may further include performing collision avoidance based on the first intermediate representation and the plurality of additional intermediate representations and a plurality of intermediate representations of a second robot.

In another aspect of the present disclosure, the method may further include performing obstacle avoidance based on the first intermediate representation and the plurality of additional intermediate representations.

In another aspect of the present disclosure, the first representation is based on data associated with the robot and the second representation is based on data associated with a user computing device.

In another aspect of the present disclosure, the method may further include obtaining first representation data from the robot. The method may further include generating the first representation based on the first representation data. The method may further include obtaining second representation data from a user computing device. The method may further include generating the second representation based on the second representation data.

In another aspect of the present disclosure, the method may further include providing at least one of the first representation, the second representation, the first intermediate representation, or an intermediate representation of the plurality of additional intermediate representations to a second robot.

In another aspect of the present disclosure, the method may further include identifying one or more robots based on at least one of a location of the one or more robots or a location of the robot. The location of the one or more robots may be within a particular proximity of the location of the robot. The method may further include providing at least one of the first representation, the second representation, the first intermediate representation, or an intermediate representation of the plurality of additional intermediate representations to each of the one or more robots.

In another aspect of the present disclosure, the method may further include identifying one or more robots based on at least one of a location of the one or more robots or a location of the robot. The method may further include obtaining at least a third representation from each of the one or more robots.

In another aspect of the present disclosure, the plurality of additional intermediate representations may include five intermediate representations.

In another aspect of the present disclosure, the method may further include identifying a time period. The method may further include periodically obtaining or providing a representation of a robot based on the time period.

In another aspect of the present disclosure, the method may further include identifying a first time period for transition from the first representation to the second representation. The method may further include identifying a second time period. The second time period may indicate an intermediate representation time period. The method may further include identifying a number of steps based on the first time period and the second time period. The method may further include generating the one plurality of additional intermediate representations based on the number of steps.

In another aspect of the present disclosure, the method may further include scaling the first intermediate representation to generate the plurality of additional intermediate representations.

One aspect of the present disclosure is a method for modifying a representation of a component. The method may include obtaining a first representation and a second representation of the component. The method may further include determining a first bounding box of the first representation and a second bounding box of the second representation. The method may further include determining one or more intermediate representations between the first representation and the second representation based on the first bounding box and the second bounding box. The method may further include causing movement of the component based on the one or more intermediate representations.

One aspect of the present disclosure is a system that can perform any elements of the method discussed above.

One aspect of the present disclosure is a system for modifying a representation of a component. The system may include at least one processor and a memory storing computer-executable instructions. Execution of the computer-executable instructions by the at least one processor can cause the at least one processor to obtain a first representation and a second representation of the component. Execution of the instructions further can cause the at least one processor to determine a first bounding box of the first representation and a second bounding box of the second representation. Execution of the instructions further can cause the at least one processor to determine one or more intermediate representations between the first representation and the second representation based on the first bounding box and the second bounding box. Execution of the instructions further can cause the at least one processor to cause movement of the component based on the one or more intermediate representations.

In another aspect of the present disclosure, execution of the instructions further can cause the at least one processor to cause display of at least one of the first representation, the second representation, or an intermediate representation of the one or more intermediate representations.

In another aspect of the present disclosure, execution of the instructions further can cause the at least one processor to cause display of a visualization identifying a transformation from the first representation to the one or more intermediate representations and a transformation from the one or more intermediate representations to the second representation.

In another aspect of the present disclosure, each of the first representation, the second representation, and the one or more intermediate representations may include an outline or shape of the component.

In another aspect of the present disclosure, each of the first representation, the second representation, and the one or more intermediate representations may include a software representation of the component.

In another aspect of the present disclosure, each of the first representation, the second representation, and the one or more intermediate representations may mimic a physical shape of the component.

In another aspect of the present disclosure, each of the first representation, the second representation, and the one or more intermediate representations may include a polygon.

In another aspect of the present disclosure, the component may include a mobile robot.

In another aspect of the present disclosure, execution of the instructions further can cause the at least one processor to perform collision avoidance based on the one or more intermediate representations.

In another aspect of the present disclosure, execution of the instructions further can cause the at least one processor to perform collision avoidance for the component based on the one or more intermediate representations and one or more second intermediate representations of a second component.

In another aspect of the present disclosure, execution of the instructions further can cause the at least one processor to perform collision avoidance for the component based on one or more second intermediate representations of a second component.

In another aspect of the present disclosure, execution of the instructions further can cause the at least one processor to perform obstacle avoidance based on the one or more intermediate representations.

In another aspect of the present disclosure, each of the first representation, the second representation, and the one or more intermediate representations may include a representation of the component at a particular time period.

In another aspect of the present disclosure, the first representation may include a representation of the component at a first time period and the second representation may include a representation of the component at a second time period. The first time period may occur prior to the second time period.

In another aspect of the present disclosure, the first representation may indicate a current shape of the component and the second representation may indicate a modified shape of the component.

In another aspect of the present disclosure, the first representation may be based on data associated with the component and the second representation may be based on data associated with a user computing device.

In another aspect of the present disclosure, execution of the instructions further can cause the at least one processor to obtain first representation data from the component. Execution of the instructions further can cause the at least one processor to generate the first representation based on the first representation data. Execution of the instructions further can cause the at least one processor to obtain second representation data from a user computing device. Execution of the instructions further can cause the at least one processor to generate the second representation based on the second representation data.

In another aspect of the present disclosure, execution of the instructions further can cause the at least one processor to provide at least one of the first representation, the second representation, or an intermediate representation of the one or more intermediate representations to a second component.

In another aspect of the present disclosure, execution of the instructions further can cause the at least one processor to identify one or more components. Execution of the instructions further can cause the at least one processor to provide at least one of the first representation, the second representation, or an intermediate representation of the one or more intermediate representations to each of the one or more components.

In another aspect of the present disclosure, execution of the instructions further can cause the at least one processor to identify one or more components based on at least one of a location of the one or more components or a location of the component. Execution of the instructions further can cause the at least one processor to provide at least one of the first representation, the second representation, or an intermediate representation of the one or more intermediate representations to each of the one or more components.

In another aspect of the present disclosure, execution of the instructions further can cause the at least one processor to identify one or more components based on at least one of a location of the one or more components or a location of the component. The location of the one or more components may be within a particular proximity of the location of the component. Execution of the instructions further can cause the at least one processor to provide at least one of the first representation, the second representation, or an intermediate representation of the one or more intermediate representations to each of the one or more components.

In another aspect of the present disclosure, execution of the instructions further can cause the at least one processor to obtain a third representation from a second component.

In another aspect of the present disclosure, execution of the instructions further can cause the at least one processor to identify one or more components. Execution of the instructions further can cause the at least one processor to obtain at least a third representation from each of the one or more components.

In another aspect of the present disclosure, execution of the instructions further can cause the at least one processor to identify one or more components based on at least one of a location of the one or more components or a location of the component. Execution of the instructions further can cause the at least one processor to obtain at least a third representation from each of the one or more components.

In another aspect of the present disclosure, execution of the instructions further can cause the at least one processor to identify one or more components based on at least one of a location of the one or more components or a location of the component. The location of the one or more components may be within a particular proximity of the location of the component. Execution of the instructions further can cause the at least one processor to obtain at least a third representation from each of the one or more components.

In another aspect of the present disclosure, the one or more intermediate representations may include five intermediate representations.

In another aspect of the present disclosure, execution of the instructions further can cause the at least one processor to periodically provide at least one of the first representation, the second representation, or an intermediate representation of the one or more intermediate representations to each of one or more components.

In another aspect of the present disclosure, execution of the instructions further can cause the at least one processor to periodically obtain at least a third representation from each of one or more components.

In another aspect of the present disclosure, execution of the instructions further can cause the at least one processor to identify a time period. Execution of the instructions further can cause the at least one processor to periodically obtain or provide a representation of a component based on the time period.

In another aspect of the present disclosure, execution of the instructions further can cause the at least one processor to identify a time period. The time period may be between about 50 milliseconds and 250 milliseconds. Execution of the instructions further can cause the at least one processor to periodically obtain or provide a representation of a component based on the time period.

In another aspect of the present disclosure, execution of the instructions further can cause the at least one processor to identify a first time period for transition from the first representation to the second representation. Execution of the instructions further can cause the at least one processor to identify a second time period. The second time period may indicate an intermediate representation time period. Execution of the instructions further can cause the at least one processor to identify a number of steps based on the first time period and the second time period. Execution of the instructions further can cause the at least one processor to generate the one or more intermediate representations based on the number of steps.

In another aspect of the present disclosure, execution of the instructions further can cause the at least one processor to scale the second representation to generate a first scaled representation. The first scaled representation may fit within the first bounding box. The first scaled representation may include a first intermediate representation of the one or more intermediate representations.

In another aspect of the present disclosure, execution of the instructions further can cause the at least one processor to downscale the second representation to generate a first scaled representation. The first scaled representation may fit within the first bounding box. The first scaled representation may include a first intermediate representation of the one or more intermediate representations. Execution of the instructions further can cause the at least one processor to upscale the first scaled representation to generate at least one additional intermediate representation of the one or more intermediate representations.

In another aspect of the present disclosure, execution of the instructions further can cause the at least one processor to downscale the second representation to generate a first scaled representation. The first scaled representation may fit within the first bounding box. The first scaled representation may include a first intermediate representation of the one or more intermediate representations. Execution of the instructions further can cause the at least one processor to upscale the first scaled representation to generate at least one additional intermediate representation of the one or more intermediate representations. A final intermediate representation of the one or more intermediate representations may include the second representation.

One aspect of the present disclosure is a non-transitory computer readable storage medium having stored thereon instructions that, when executed, can cause at least one computing device to obtain a first representation and a second representation of a component. Execution of the instructions further can cause the at least one computing device to determine a first bounding box of the first representation and a second bounding box of the second representation. Execution of the instructions further can cause the at least one computing device to determine one or more intermediate representations between the first representation and the second representation based on the first bounding box and the second bounding box. Execution of the instructions further can cause the at least one computing device to cause movement of the component based on the one or more intermediate representations.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

DETAILED DESCRIPTION

Figure 1:
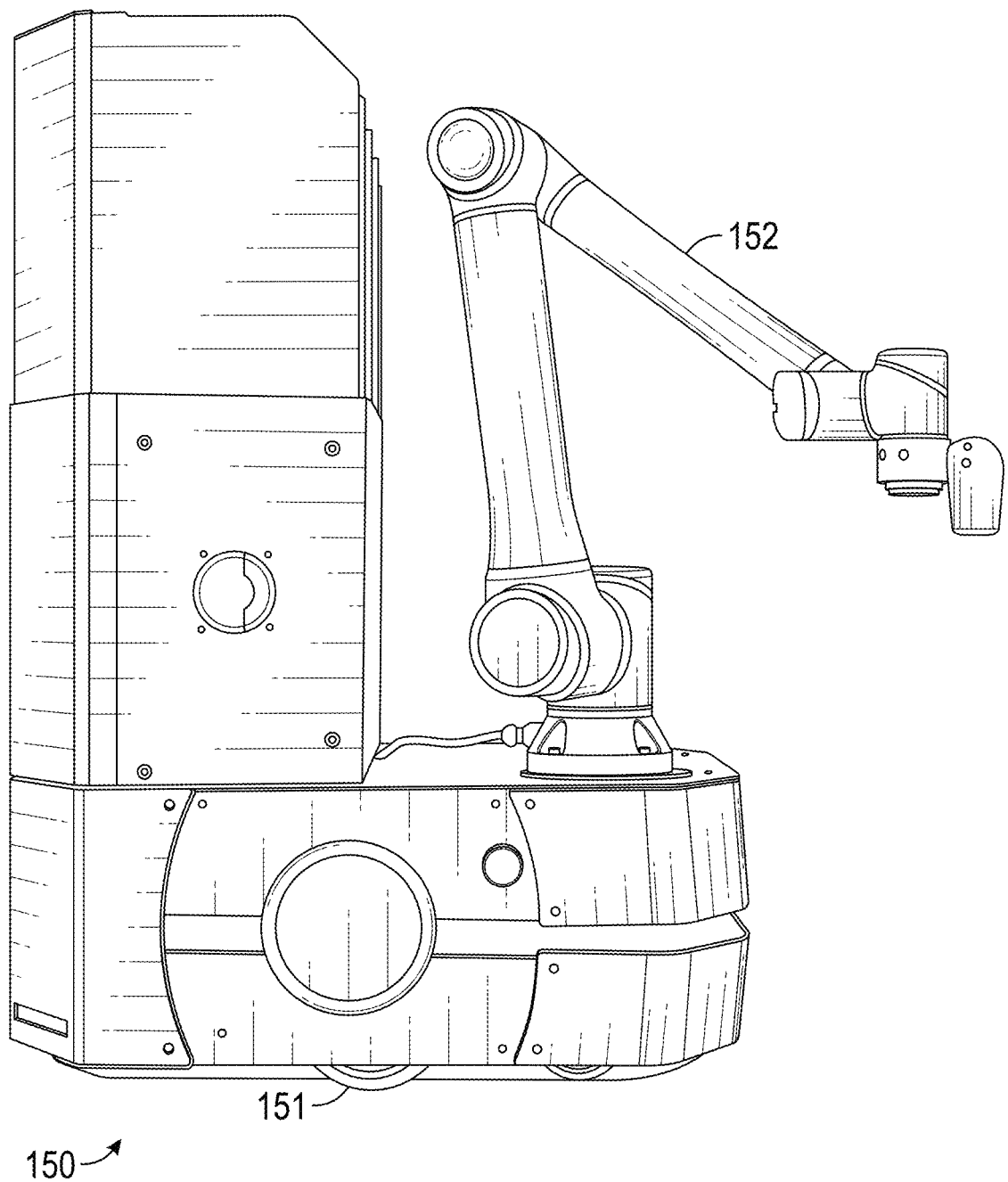
FIG. 1 illustrates an example mobile robot according to some embodiments.

Generally described, the present disclosure relates to modifying a representation (e.g., a software representation) of a component (e.g., a machine, a device, a robot, etc.) using a representation generation system. For example, the representation generation system can be in communication with the component and generate a representation of the component based on data provided by the component. The representation may be an approximation of the physical shape (e.g., outline) of the component. For example, the representation may be a software representation of the hardware of the component. For example, the component may be a mobile robot that includes a base, one or more arms, one or more legs, one or more additional interactive elements, etc. and the representation of the component may be a representation of the physical shape of the base, the one or more arms, the one or more legs, the one or more additional interactive elements, etc. In some cases, the representation of the component may be a one-dimensional, a two-dimensional, a three-dimensional, etc. representation of the component.

The representation generation system (or a separate system) may utilize the representations of the component to adjust performance and/or actions of the component. By modifying (e.g., periodically or aperiodically) the representation of the component, the representation generation system can adjust the performance of the component (and/or other components that interact with the component). For example, the representation generation system can adjust how the component moves through an environment based on the modified representations of the component (e.g., for collision avoidance or navigation pathfinding). Therefore, it may be important that the representation of the component be an accurate representation of the component as errors within the representation may cause the component to perform undesired actions (e.g., bump into an obstacle, become stuck, get lost, etc.)

The methods and apparatus described herein enable a representation generation system to initiate a process to generate representations of a component. For example, the representation generation system can generate intermediate representations of the component that represent representations of the component as the component transitions from a first shape associated with the first representation to a second shape associated with the second representation. The component may transition from the first shape to the second shape to maneuver within an environment, manipulate and/or interact with one or more objects or other components, etc. Such a representation generation system can enable the accurate identification of the component within a given environment. For example, the representation generation system can enable a system to identify how the component may interact with another component, with the environment (e.g., obstacles within the environment), etc.

The representation generation system can initiate the process in response to user input received via a user computing device. For example, a user may provide user input, via the user computing device, and request the component to transition from a first state (e.g., a first shape) to a second state (e.g., a second shape). The representation generation system can determine representations of the component as the component transitions from the first state to the second state to identify an estimated state of the component during a particular time period. Various other types of input or triggers can cause the component to change shape or size, and can cause the representation generation system to modify the representation of the component. By way of example, a robot can receive a command to perform a task, which can cause the robot to change shape or size (e.g., to extend or otherwise move an articulated arm or other component). The representation generation system can modify the representation of the robot (or component thereof) to track the movement of the articulated arm or other component of the robot. The modified representations can be used by the robot, or by other robots or systems, to make determinations based on the size, shape, or position of the robot (or component thereof) as represented by the determined representation.

In many conventional cases, implementing a general representation system to identify a representation of a component may not provide satisfactory results in particular circumstances or for particular users. Such a general process may include identifying a first representation of the component (e.g., a current representation of the component, such as representing the starting position or shape before movement of the component) and a second representation of the component (e.g., a desired representation of the component, such as representing the ending position or shape after a movement of the component) and automatically switching from the first representation to the second representation. The general process may include automatically switching from the first representation to the second representation at a particular time period before, during, or after the robot transitions from the first shape to the second shape. For example, such a general process may include switching from the first representation to the second representation based on determining that the component has initiated a process to change shapes from a first shape associated with the first representation to a second shape associated with the second representation. In another example, such a general process may include switching from the first representation to the second representation based on determining that the component has completed a process to changes shapes from the first shape to the second shape. Therefore, the representations may transition directly and automatically from the first representation to the second representation.

As the representations may transition directly and automatically from the first representation to the second representation, the representation of the component may not be an accurate representation of the shape of the component. For example, if the general system switches from the first representation to the second representation based on determining that the component has initiated a process to switch from a first shape to the second shape, the second representation may not represent the various intermediate shapes of the component as the component switches from the first shape to the second shape. In another example, if the general system switches from the first representation to the second representation based on determining that the component has completed a process to switch from the first shape to the second shape, the first representation may not represent the various intermediate shapes of the component as the component switches from the first shape to the second shape.

In some cases, a user may attempt to manually define different shapes for the component. For example, a user may define a first shape, a second shape, a third shape, a fourth shape, and a fifth shape and may cause the component to transition from the first shape to the second shape, from the second shape to the third shape, from the third shape to the fourth shape, and from the fourth shape to the fifth shape to effectuate the component transitioning from the first shape to the fifth shape. Some systems may generate representations of each of the first shape, the second shape, the third shape, the fourth shape, and the fifth shape and transition between each of the representations. However, such a process may be inefficient and impractical as it may require not only that the user define each of the various shapes, but also that the component physically transition between each of the various shapes. Such a process may be power-intensive, time-consuming, and impractical.

The methods and apparatus described herein enable a system to generate representations of a component that represent the component as the component transitions from a first shape to a second shape and provide a more accurate representation of the component as compared to general systems that transition directly from a first representation associated with a first shape to a second representation associated with a second shape. For example, the system can generate intermediate representations that identify one or more shapes of the component as the component transitions from the first shape to the second shape. By generating and utilizing intermediate representations representing the component as the component transitions from the first shape to the second shape, the system can increase the accuracy and the efficiency of the component. Therefore, the efficiency and speed of the component can be increased by such a process. For example, as the system may identify a more accurate representation of the component as compared to other processes, the component (or other devices) may navigate the environment in a faster and more efficient manner (e.g., by avoiding potential collisions).

As components (e.g., mobile robots, computing devices, etc.) proliferate, the demand for more accurate representations of the components has increased. For example, a particular environment may include a plurality of components that may each be maneuvering in the environment and each component may attempt to avoid collisions with other components, obstacles, etc. within the environment. The present disclosure provide systems and methods that enable a reduction in the collisions and potential collisions experienced by a component. Further, the present disclosure provides systems and methods that enable a reduction in the time and user interactions, relative to traditional embodiments, to transition from a first shape to a second shape without significantly affecting the speed or power consumption of the device when adjusting from a first shape to a second shape. These advantages are provided by the embodiments discussed herein, and specifically by implementation of a process that includes the generation of intermediate representations of the component.

As described herein, the process of generating the representations of the component may include obtaining a first representation and a second representation of the component. The first representation of the component may be a current representation of the component. For example, the first representation of the component may represent a current state or pre-movement state of the component. In some cases, the first representation of the component may represent a state of the component based on the component completing an action, task, etc. For example, the component may be in the process of grasping an item with an arm of the component and the first representation of the component may represent the state of the component after the component completes the process of grasping the item.

The second representation of the component may be a defined representation of the component (e.g., a desired representation of the component). The second representation of the component may represent a future state of the component. For example, the second representation of the component may represent a desired state, a target state, or a post-movement state of the component. The second representation of the component may represent a state of the component after performance of a particular task by the component. In some cases, the first shape (and the first representation) may be smaller than the second shape (and the second representation). In other cases, the first shape (and the first representation) may be larger than the second shape (and the second representation).

In some cases, the first representation of the component and/or the second representation of the component may represent user-defined states of the component. For example, the representation generation system may obtain, from a user computing device, information identifying a first state of the component and a second state of the component. The information may identify that the component is to transition from the first state to the second state. In some cases, if the component is not configured according to the first state, to transition from the first state to the second state, the representation generation system may cause the component to transition to the first state prior to transitioning from the first state to the second state.

Based on the first representation and the second representation of the component, the representation generation system can generate one or more intermediate representations of the component. For example, the one or more intermediate representations of the component may identify one or more intermediate states of the component as the component transitions from a first state (associated with the first representation) to a second state (associated with the second representation). To generate the one or more representations of the component, the representation system can identify and/or generate bounding boxes (bounding box coordinates) associated with the first representation and/or the second representation of the component.

The representation generation system can scale the second representation to generate a first intermediate representation. For example, the representation generation system can downscale the second representation to fit within the bounding box of the first representation, such as if the second representation is larger than the first representation. In some cases, the second representation may be smaller than the first representation and the representation generation system can upscale the second representation to fit within the bounding box of the first representation. Specifically, the representation generation system can upscale and/or downscale the second representation by generating a scaling factor between the first representation and the second representation. In some cases, the representation generation system can upscale and/or downscale the second representation by matching one or more bounding box coordinates of the second representation to one or more bounding box coordinates of the first representation. For example, the representation generation system can perform scaling and match one or more bounding box coordinates identifying a horizontal boundary of the second representation to one or more bounding box coordinates identifying a horizontal boundary of the first representation. In some embodiments, the second representation can be scaled differently along different dimensions, such as if the bounding box of the first representation and the bounding box of the second representation have different aspect ratios. In some cases, the second representation can be upscaled in a first dimension and can be downscaled in a second dimension. Therefore, the representation generation system can generate the first intermediate representation.

The representation generation system can generate one or more additional intermediate representations by scaling the first intermediate representation. For example, the representation generation system can downscale or upscale the first intermediate representation to generate one or more additional intermediate representations. The representation generation system may iteratively scale a prior intermediate representation to generate a subsequent intermediate representation. For example, the representation generation system may scale the first intermediate representation to generate a second intermediate representation, scale the second intermediate representation to generate a third intermediate representation, scale the third intermediate representation to generate a fourth intermediate representation, etc. Therefore, the representation generation system can generate the intermediate representations.

In some cases, the representation generation system may generate the intermediate representation based at least in part on a step size. For example, the step size may be used to determine a number of intermediate representations between the first representation and the second representation. The representation generation system may identify the step size (e.g., which can be defined by a user in some embodiments). In some cases, the representation generation system may determine the number of steps based on a first time period for the component to transition between the first state and the second state and a second time period identifying how frequently the intermediate representations are updated (e.g., a step duration or frequency). For example, the representation generation system can divide the first time period by the second time period to generate the number of intermediate steps. The number of steps can be used to determine how much the representation changes with each intermediate step, as discussed herein.

Based on the first representation, the second representation, and the one or more intermediate representations, the representation generation system can cause the component to perform one or more actions. For example, the representation generation system can communicate with one or more systems (e.g., a navigation system) to cause performance of the one or more actions. The one or more actions may include navigating within an environment, performing an obstacle and/or collision avoidance process, performing a task, etc. In some cases, the representation generation system can control, command, etc. the component to perform the one or more components. As the representation generation system may cause the component to perform the one or more actions based on the intermediate representations, the component may more efficiently and more accurately perform the tasks as compared to systems that rely on the first and second representations.

Mobile Robots

FIG. 1 shows an example mobile robot 150 (which may be an example of a component as discussed above), according to one embodiment. The mobile robot 150 can include one or more wheels 151. The mobile robot 150 can include one or more drive systems, which can move the robot 150. The robot 150 can include one or more motors (e.g., electric motors), which can turn the one or more wheels 151. The robot 150 can have a braking system in some embodiments. The mobile robot 150 can have one or more movable components, which can change the shape or footprint of the mobile robot 150. For example, the mobile robot 150 can have an articulating arm 152, which the mobile robot 150 can use to pick up, move, or otherwise manipulate objects. The arm 152 can move to various different positions causing the overall mobile robot 150 to have various different shapes, depending on the position of the arm 152. The robot 150 can include one or more actuators for moving the arm.

Robots, such as the mobile robot 150 described herein, may perform various actions. As the robots perform the various actions, the shape of the robot may change. For example, the shape of the robots may change as the robots turn, as the robots actuate one or more elements of the robot (e.g., an arm, a port, etc. of the robot). As the shape of the robots may change, it may be important that associated systems utilize an accurate representation of a given shape of the robots at a particular time period. If associated systems do not have an accurate representation of a given shape of the robots, the robots may be more likely to stall, to get stuck, to interact with (e.g., bump, crash into, etc.) obstacles and/or other robots, etc.

System Overview

Figure 2:
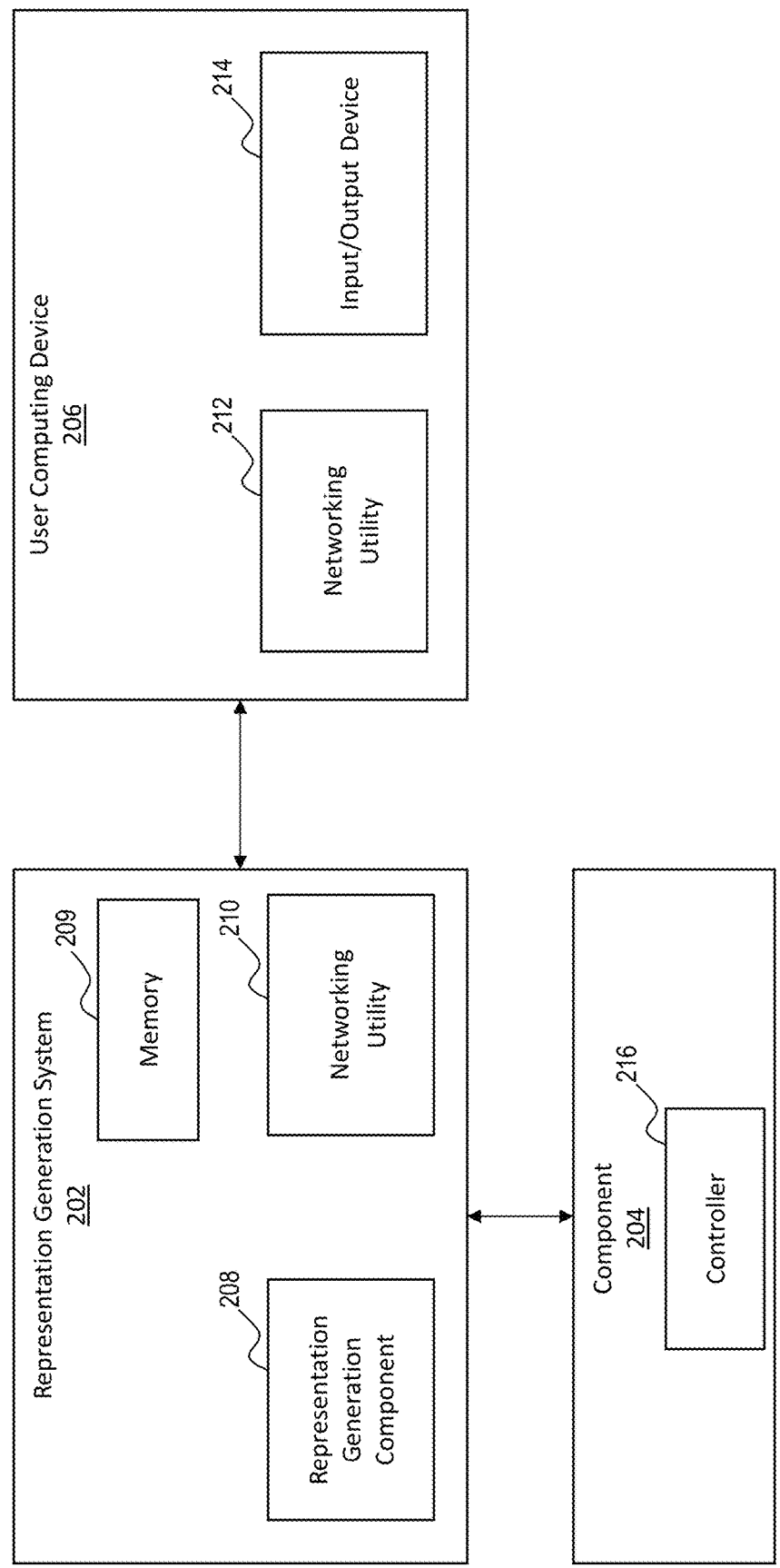
FIG. 2 depicts an example environment including a computing device for modifying the representation of a robot in accordance with aspects of the present disclosure.

FIG. 2 depicts a schematic diagram of a system 200 including a representation generation system 202 according to some embodiments herein. In the illustrated embodiment, the system 200 includes a representation generation system 202, a component 204, and a user computing device 206. Any one or any combination of the components shown and described in FIG. 2 can each be implemented using one or more computing devices, such as, but not limited to one or more servers, processors, computing devices, virtual machines, etc., and can communicate via a wired connection or a wireless connection (e.g., via a network not shown in FIG. 1) for modifying a representation of the component 204. For example, the representation generation system 202 and the user computing device 206 may communicate via a local area network or a wide area network such as the Internet.

The representation generation system 202 and/or the user computing device 206 may include one or more computing systems or computing devices that can include any network-equipped computing device, for example desktop computers, laptops, smartphones, tablets, and the like or any non-network-equipped computing device. In some embodiments, the representation generation system 202 and the user computing device 206 can be incorporated into the same computing system (e.g., laptop or smartphone, etc.). Further, the representation generation system 202 and the user computing device 206 can be integrated into the same computer or program (e.g., so that one data transfer link is used). In some embodiments, the representation generation system 202 can be built into the component 204 (e.g., so that one data transfer link is used). In some embodiments, the user computing device 206 can be omitted. In some embodiments, the robot or other component 204 can include the representation generation system 202. The component 204 can use the representation generation system 202 to determine its own shape, and the component 204 can use that information for collision avoidance, navigation, etc. In some implementations, the information about the shape of the component 204 can be sent to other devices (e.g., to other robots or components), and those other devices can use the information about the shape of the component 204, such as for collision avoidance, navigation, etc.

The user computing device 206 may include one or more computing devices associated with a user. The user may utilize the user computing device 206 to provide representations (e.g., a user-defined representation, a desired representation, etc.) to the representation generation system 202. For example, the user may utilize the user computing device 206 to define an action for the component 204 and/or a subsequent representation of the component 204 based on the performance of the action. The user computing device 206 may include a networking utility 212 and an input/output device 214. In some embodiments, the user computing device 206 can be used to set parameters for the representation system 202. The user computing device 206 can be used to designate a number of intermediate steps and/or an interval time for each intermediate step. The user computing device 206 can be used to designate representation shapes for various configurations of the component 204. The representation generation system 202 can then use those designated representation shapes when the component has the associated configurations. By way of example, the user can specify a first representation having a first or shorter length for the configuration in which the arm of the robot is retracted, and the user can specify a second representation having a second or longer length for the configuration in which the arm of the robot is extended. In some embodiments, the user computing device 206 can be configured to receive commands from a user that cause the component 204 to change shape, such as a command for the robot to use its manipulator arm. In some embodiments, the user computing device can be incorporated into the component 204 (e.g., as a user interface on a robot).

The representation generation system 202 may include one or more computing devices for dynamically generating the representations of the component 204. The representation generation system 202 can include a representation generation component 208, memory 209, and a networking utility 210. The representation generation system 202 may utilize the representation generation component 208 to dynamically generate the representations of the component 204. The representation generation system 202 can communicate with the component 204 via a wired or wireless connection, or can be incorporated into the component 204 as discussed herein.

The component 204 may include one or more devices (e.g., a machine, equipment, a computing device, a robot, a mobile robot, or any other devices). For example, the component 204 may include the mobile robot 150 as described in FIG. 1. The component 204 may include one or more elements that may have varied states (shapes). For example, the component 204 may include a particular element (e.g., an arm) that may have a shape that varies as one or more actions are performed. In some embodiments, the state of the component 204 may be variable (e.g., as the component 204 performs an action such as turning, moving, etc.). In the example of FIG. 2, the component 204 includes a controller 216. The controller 216 may be a mechanical, electro-mechanical, or electronic device that causes the performance of an operation based on receive input (e.g., representation data) and causes the component 204 (or an element of the component 204) to transition from a first state to a second state.

The representation generation system 202 and/or the user computing device 206 may include a networking utility for data communication. For example, as shown in FIG. 1, the representation generation system 202 includes a networking utility 210 and the user computing device 206 includes a networking utility 212. The networking utility 210 and the networking utility 212 may enable data communication between the representation generation system 202 and the user computing device 206. Further, the networking utility 210 and the networking utility 212 may enable data communication between the representation generation system 202 and the user computing device 206 over a network (e.g., the Internet). The network can include any appropriate network, including an intranet, the Internet, a cellular network, a local area network or any other such network or combination thereof. Protocols and components for communicating via the Internet or any of the other aforementioned types of communication networks are known to those skilled in the art of computer communications and thus, need not be described in more detail herein.

The representation generation system 202 and the component 204 may communicate data via a streaming data connection (e.g., via a data stream). For example, the representation generation system 202, via the representation generation component 208, may stream actions, states, representations, etc. to the component 204 (e.g., at periodic intervals and/or as the information is obtained by the representation generation system 202) via the data stream, and, in response to the received actions, states, representations, etc., the component 204 may transition from a first state to a second state. The representation generation system 202 and the user computing device 206 may communicate data via a streaming data connection (e.g., via a data stream).

A state or representation of the component 204 (e.g., a current state or representation of the component 204) can be sent from memory (e.g., volatile memory and/or non-volatile memory) of the component 204 to memory (e.g., volatile memory and/or non-volatile memory) of the representation generation system 202. In some implementations, the state or representation of the component 204 can be sent from the memory (e.g., volatile memory and/or non-volatile memory) of the representation generation system 202 to the memory (e.g., volatile memory and/or non-volatile memory) of the user computing device 206.

The user computing device 206 includes an input/output device 214 for obtaining input identifying a state and/or representation of the component 204, and/or for providing output identifying representations or states of the component 204 (e.g., intermediate representations generated by the representation generation system 202). For example, the input/output device 214 may include a display, a touchscreen, a keypad, a speaker, a microphone, or any other device to receive input and/or provide an output. Further, the input/output device 214 may be an application programming interface ("API"). The user computing device 206 may communicate with the input/output device 214 to receive the state and/or representation of the component 204. In some cases, a user may drive the component 204 and/or cause the component 204 to perform various actions using the user computing device 206. For example, the user computing device 206 may include a joystick to maneuver the component 204 and/or a touchscreen to provide inputs identifying an action. Further, the user computing device 206 may communicate with the input/output device 214 to enable (e.g., cause) display of the representations or states of the component 204. In some embodiments, the user computing device 206 may communicate the representations or states of the component 204 separately or may provide a uniform resource identifier ("URI") (e.g., a uniform resource locator ("URL")) that enables a system to access the representations or states of the component 204. In some embodiments, the component 204 can be an autonomous robot that can operate without user input.

The user can provide an input command to the input/output device 214 of the user computing device 206 to initiate the component 204 to transition from a first state to a second state. For example, the input command may include a request to perform a particular action (e.g., maneuver to a particular location, perform a task, actuate one or more elements of the component 204, etc.). In some cases, the user computing device 206 may route the input command to the component 204 via the representation generation system 202. In other cases, the user computing device 206 may communicate with the component 204 and may communicate the input command directly to the representation generation system 202. In such cases, the user computing device 206 may separately communicate the input command to the representation generation system 202. In some embodiments, the component 204 (e.g., a robot) can make a determination to transition from a first state to a second state, such as without user input. The component 204 can be an autonomous or automatically controlled robot.

The representation generation system 202 can receive the input command from the user computing device 206 and current state data from the component 204 via the networking utility 210. In some cases, in response to receiving the input command from the user computing device 206, the representation generation system 202 may request the state data from the component 204. For example, the representation generation system 202 may request data identifying a current state of the component. In some cases, the representation generation system 202 may pause implementation of the transition from the first state to the second state by the component 204. For example, the representation generation system 202 may pause implementation of the transition from the first state to the second state and cause the component 204 to proceed with the implementation once the representation generation system 202 determines that a particular number of intermediate representations have been generated for the transition from the first state to the second state. In some embodiments, the component 204 can maintain information about its current state and an associated current representation. In some embodiments, the component 204 itself can include the representation generation system 202.

The representation generation system 202 can generate the representations. In some embodiments, based on receiving the input command from the user computing device 206 and the current state data from the component 204, the representation generation system 202 can utilize the representation generation component 208 to generate the representations of the component 204. To generate the representations, the representation generation component 208 may generate a first representation of the component 204 based on the current state data (e.g., representing a current representation of the component) and a second representation of the component 204 based on the input command (e.g., representing a desired or target representation of the component 204).

The representation generation component 208 may generate a scaling factor between the first representation and the second representation. In some cases, for the first representation and the second representation of the component 204, the representation generation component 208 may identify and/or generate one or more bounding boxes associated with the representations. For example, the representation generation component 208 may identify one or more bounding box coordinates identifying the bounding boxes of the representations. A first bounding box can be determined for the first representation (e.g., corresponding to the initial or pre-movement state). A second bounding box can be determined for the second representation (e.g., corresponding to the target or post-movement state). Further, in some cases, the bounding box coordinates may identify a maximum and/or a minimum value in one or more axes for all or a portion of the representations. For example, the bounding box coordinates may identify a minimum y-axis value, a maximum y-axis value, a minimum x-axis value, and a maximum x-axis value for each or a portion of the representations. The bounding boxes can be rectilinear. The bounding boxes can be two-dimensional rectangles, such as with four corners. The four corners of the bounding box can be defined by the first and second (e.g., minimum and maximum) x-axis values and the first and second (e.g., minimum and maximum) y-axis values. In some embodiments, three-dimensional bounding boxes can be used (e.g., with first and second z-axis coordinates).

The representation generation component 208 can determine a first intermediate representation. The representation generation component 208 may scale the second representation based on the scaling factor and/or the bounding box of the first representation to generate the first intermediate representation. The representation generation component 208 may scale (e.g., downscale, upscale, etc.) the second representation to fit within and/or to fill the bounding box of the first representation. For example, the representation generation component 208 may identify a factor to multiply one or more bounding box coordinates (e.g., a minimum and maximum y-axis value and/or a minimum and maximum x-axis value) of the second representation such that the one or more bounding box coordinates of the second representation match one or more bounding box coordinates of the first representation. In some cases, separate scaling factors can be determined for each dimension of the bounding box (e.g., an x-axis scaling factor and a y-axis scaling factor for 2D embodiments). The representation generation component 208 may scale all or a portion of the bounding box coordinates of the second representation using the identified factor(s) to generate a scaled second representation (e.g., a first intermediate representation). In some cases, all or a portion of the bounding box coordinates of the scaled second representation may match the bounding box coordinates of the first representation. In other cases, one or more of the bounding box coordinates of the scaled second representation may not match the bounding box coordinates of the first representation. For example, x-axis bounding box coordinates of the scaled second representation may not match x-axis bounding box coordinates of the first representation and y-axis bounding box coordinates of the scaled second representation may match y-axis bounding box coordinates of the first representation. In another example, x-axis bounding box coordinates of the scaled second representation may match x-axis bounding box coordinates of the first representation and y-axis bounding box coordinates of the scaled second representation may not match y-axis bounding box coordinates of the first representation. In some cases, all or a portion of the bounding box coordinates of the second representation may be scaled such that all or a portion of the bounding box coordinates approximate, but do not match, the bounding box coordinates of the first representation.

The representation generation process may include multiple intervals. At each interval of the multiple interval process, the representation generation component 208 may take a prior scaled representation and scale the prior scaled representation. At or after a first time interval, the representation generation component 208 may scale the scaled second representation (e.g., the first intermediate representation) to generate a second intermediate representation. At or after a second time interval, the representation generation component 208 may scale the second intermediate representation to generate a third intermediate representation, etc. It will be understood that the representation generation process may include any number of time intervals. For example, the representation generation process may include n intervals where n can be any number.

In some cases, the number of intervals of the representation generation process may be based on a step size or duration. The representation generation component 208 may determine and/or generate a number of intermediate steps. For example, the representation generation component 208 may generate the number of steps based on a first time period associated with a transition between a first state associated with the first representation and a second state associated with the second representation and a second time period associated with the interval between intermediate representations. The representation generation component 208 may identify the first time period based on historical data (e.g., the representation generation component 208 may track a time period for transition between the first state and the second state), user-defined data (e.g., a user may provide data indicating the first time period for the transition), machine learning generated data (e.g., the representation generation component 208 may utilize one or more machine learning models to determine an amount of time for the transition), etc. In some embodiments, time durations for various movements or transitions can be stored in computer readable memory (e.g., in a look-up table or database). The representation generation component 208 may identify the second time period based on system-defined data (e.g., a system-defined time period for intervals between intermediate representations), user-defined data, user computing device capabilities (e.g., processing speed of the user computing device 206), etc. The representation generation component 208 may divide the first time period by the second time period to identify the number of steps. For example, for a first time period of 10 seconds and a second time period of 100 milliseconds, the representation generation component 208 may identify a number of steps to be 100 steps. For each step, the representation generation component 208 may generate a corresponding intermediate representation. For example, for a step size of 100, the representation generation component 208 may generate 100 intermediate representations between the first representation and the second representation. The time duration of each step can be about 10 milliseconds, about 20 milliseconds, about 30 milliseconds, about 40 milliseconds, about 50 milliseconds, about 60 milliseconds, about 70 milliseconds, about 80 milliseconds, about 90 milliseconds, about 100 milliseconds, about 110 milliseconds, about 125 milliseconds, about 150 milliseconds, about 175 milliseconds, about 200 milliseconds, about 225 milliseconds, about 250 milliseconds, about 300 milliseconds, about 350 milliseconds, about 400 milliseconds, about 450 milliseconds, about 500 milliseconds, or more, or any values therebetween, or any ranges between any of these values, although other embodiments outside these ranges are possible.

A final representation of the intermediate representations may correspond to the second representation. In some cases, the final representation of the intermediate representations corresponds to an intermediate representation immediately prior to the second representation.

Based on generating the intermediate representations, the representation generation component 208 may cause the component 204 to initiate the transition from the first state (associated with the first representation) to the second state (associated with the second representation). As the component 204 transitions from the first state to the second state, the representation generation component 208 may update the representation of the component 204 using the intermediate representations. The representation generation component 208 may synchronize the intermediate representations such that the representation generation component 208 initiates the transition from the first representation to the second representation using the intermediate representations as the component 204 initiates transition from the first state to the second state.

The representation generation component 208 (or a separate system) may utilize the representations (e.g., as synchronized to the state of the component 204) to identify how to cause the component 204 and/or other components to perform actions. For example, the representation generation component 208 may cause the component 204 to navigate an environment (e.g., based on communications with a navigation system), perform obstacle avoidance, perform collision avoidance, etc. based on a particular intermediate representation of the component 204 identifying a state (e.g., a current state) of the component 204 as the component 204 transitions from the first state to the second state. As the representation generation component 208 may access a representation of the environment of the component 204 (e.g., based on sensor data), it may be important for the representation generation component 208 to identify an accurate representation of the component 204. For example, if the representation of the component 204 is erroneous (e.g., the representation indicates that the shape of the component 204 is different from the actual shape of the component 204), the representation generation component 208 (or a separate navigation system relying on the representation) may cause the component 204 to perform an action that results in the component 204 impacting another component, impacting an obstacle, becoming stuck, damaging the component, etc. The component 204 can operate the drive system based at least in part on one or more of the intermediate representations. The component 204 can stop or slow the robot using the drive system or a braking system based at least in part on one or more of the intermediate representations.

In some cases, the representation generation component 208 may obtain representations of other components within the environment of the component 204. For example, the environment may include a plurality of components that are each operating within the environment. The representation generation component 208 may obtain the representations of the plurality of components and determine how to cause the component 204 to perform actions based on the representations of the plurality of components and the representation of the component 204 (e.g., to avoid impacts between the components, to avoid impacts with obstacles, etc.).

User Interfaces for Displaying Representations of a Component

Figure 3:
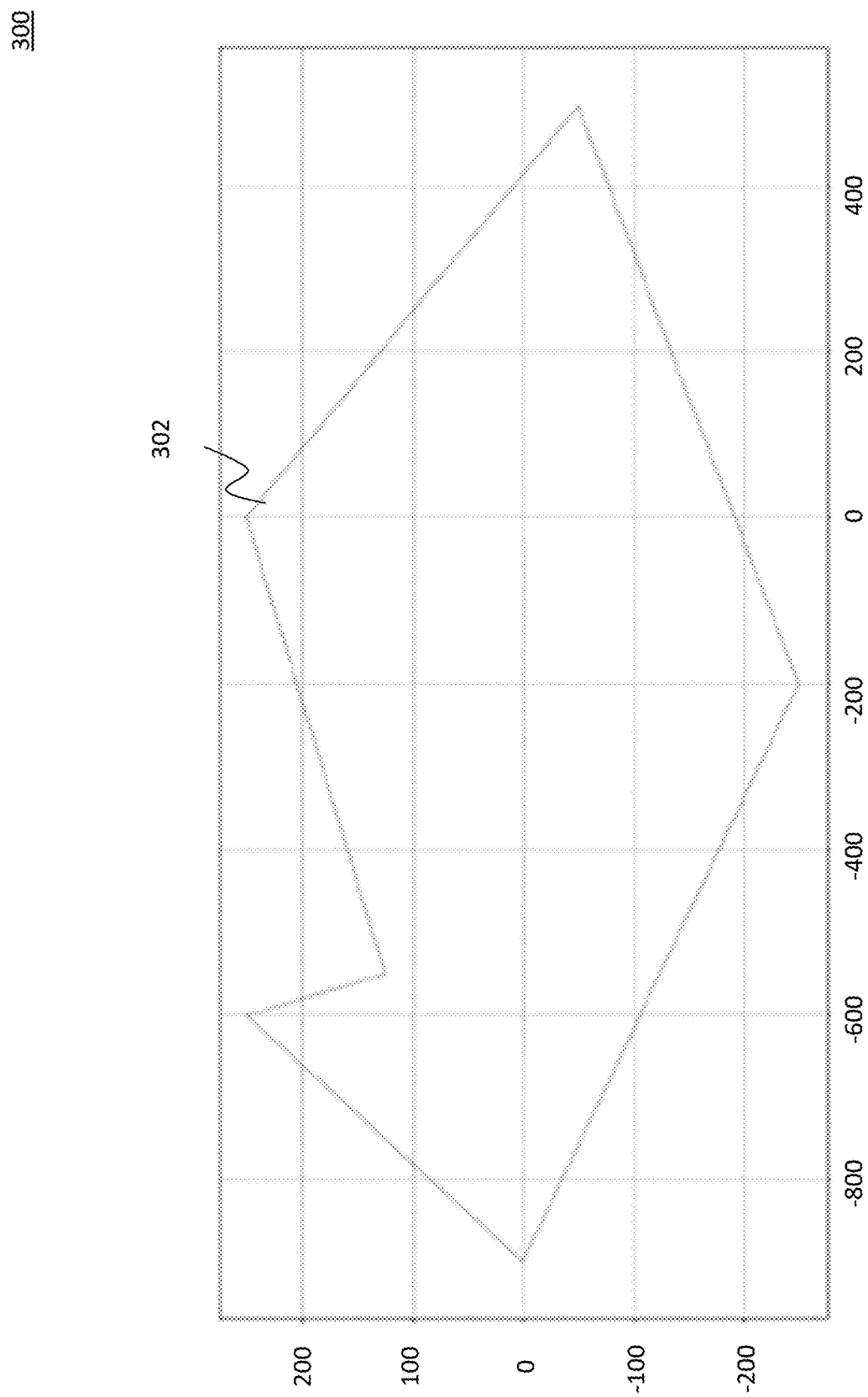
FIG. 3 illustrates a user interface (UI) related to dynamically modifying a representation of a robot, according to some embodiments of the present disclosure.

FIG. 3 depicts an example user interface 300 displaying a visualization of a representation of a component. The example user interface 300 is illustrative of an interface that the representation generation system (or a separate system) can cause to be generated (and presented to a user) for identifying representations dynamically generated for a component. It will be understood that the user interface 300 is illustrative only, and the representation generation system may offer any type of user interface to enable the identification and display of the representations. In some embodiments, the representations are not displayed, and the component 204 or other devices can use the representations to make determinations (e.g., for pathfinding or collision avoidance) without presenting the representations to the user.

The user interface 300 may further include a first representation 302. The user interface 300 may further include more, less, or different interfaces. The first representation 302 may be a current representation of a component. In some cases, the first representation 302 may be an initial representation of the component. The representation 302 may correspond to a current or initial state of the component, such before a transition. For example, the representation 302 may identify a state of the component during an initial time period.

In some embodiments, a system may generate the first representation 302 and in some cases can provide the first representation 302 for display. The system may obtain state data from the component. For example, the system may obtain sensor data from one or more sensors of the component, sensor data from one or more sensors within an environment of the component, data associated with one or more elements of the component (e.g., state data identifying a state of an arm of the component, state data identifying a state of a leg or wheel of the component, etc.). Based on the obtained state data, the system may generate the first representation 302 such that the first representation 302 represents the state of the component. In some embodiments, the component or system can know the current state or position of the component or portion thereof (e.g., movable arm) because of prior commands. After the component receives a command to move the arm to a first position, the arm can be determined to be at the first position until a new command is received to move the arm to a second position.

The first representation 302 may be a visualization of a particular shape. For example, the first representation 302 may be a visualization of a polygon. In some cases, the first representation 302 may not directly correspond to the first state of the component. To generate the first representation 302, the system may generalize one or more aspects of the first state of the component. For example, the first state of the component may identify a component with m sides where m can be any number. The system may generalize the component and generate a first representation 302 of the component that includes n sides where n can be any number less than m. In some cases, the first state of the component may identify a component with curves, a three-dimensional component, or any other component and the system may generalize the component by representing the component using a first representation 302 that includes a two-dimensional polygon. Therefore, the system may reduce the complexity of the component and generate the first representation 302. In some cases, the first representation 302 can be somewhat larger than the component in the first state, such as to provide a buffer.

The system generating the first representation 302 may provide the first representation to an application for managing actions to be performed by the component. For example, the system may be the representation generation system. Further, the representation generation system or a separate system may implement the application to manage actions to be performed by the component based on the first representation 302 (e.g., such as for navigation or collision avoidance). The drive system of the component (e.g., mobile robot) can be operated based at least in part on the first representation 302.

In some cases, the user interface 300 may depict a visualization of representations of multiple components. For example, the user interface 300 may depict a visualization of first representations for all or a portion of the components within a particular environment. In some embodiments, each component (e.g., robot) can determine representations for its own positions and configurations, and can have sensors to identify other components (e.g., other robots) or other objects in the environment, and can use that information for navigation and/or collision avoidance. In some embodiments, one component (e.g., robot) does not receive or use the representation information associated with the other components (e.g., other robots). In other embodiments, the decisions for navigation and/or collision avoidance can be made using the representation information for multiple components. In some cases, components (e.g., robots) can broadcast or otherwise transfer (e.g., wirelessly) their representation information to other components (e.g., other robots), so that those other components can use that representation information (e.g., for navigation and/or collision avoidance). In some cases, a single system can control the navigation and/or collision avoidance of multiple components (robots). In other embodiments, each component (e.g., robot) can determine its own navigation and/or collision avoidance decisions.

In the particular example of FIG. 3, the user interface 300 includes a first representation 302 that illustrates a polygon. The first representation 302 includes a polygon with six sides. It will be understood that the first representation 302 may include more, less, or different sides. The first representation 302 is displayed with respect to a graph (e.g., a graph based on the environment of the component) that identifies x-axis coordinates and y-axis coordinates.

Figure 4:
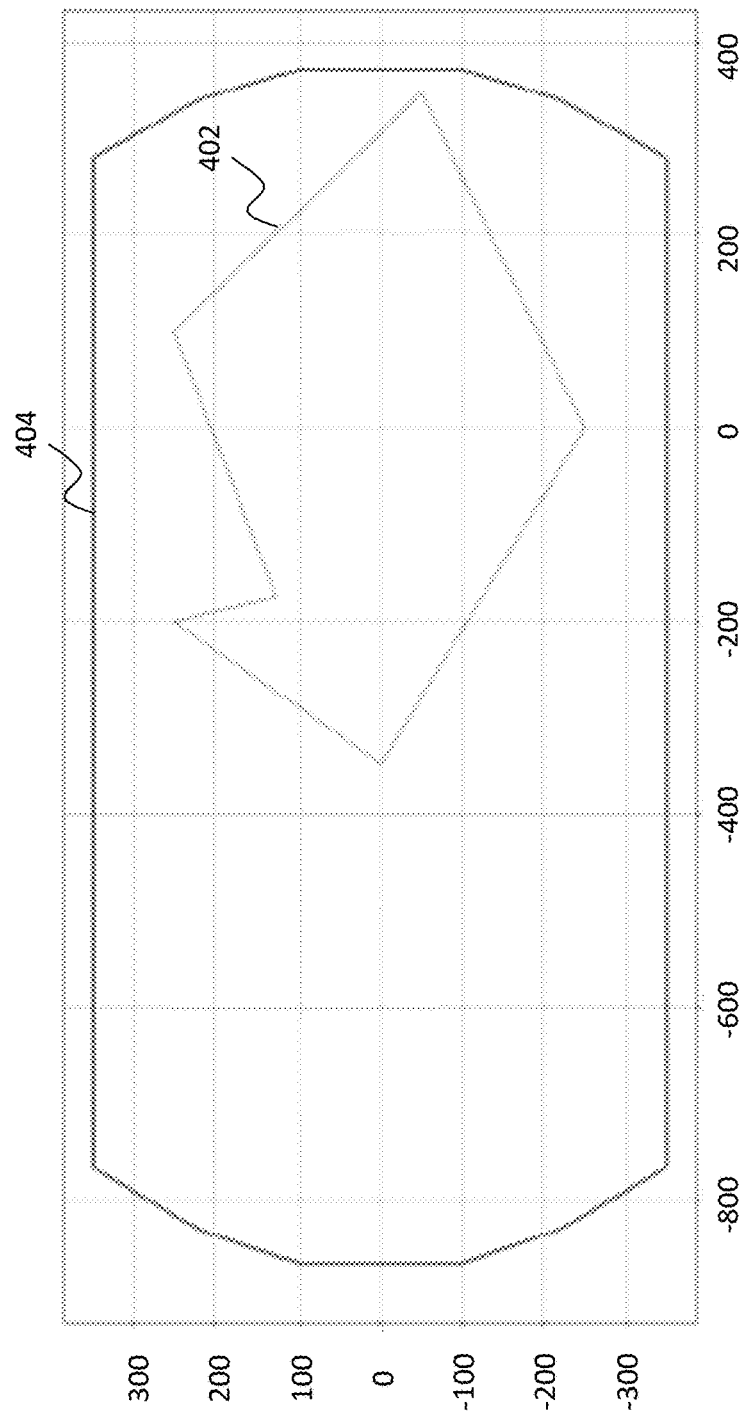
FIG. 4 illustrates a user interface (UI) related to dynamically modifying a representation of a robot, according to some embodiments of the present disclosure.

FIG. 4 depicts an example user interface 400 displaying a visualization of representations of a component. The example user interface 400 is illustrative of an interface that the representation generation system (or a separate system) can cause to be generated (and presented to a user) for identifying representations dynamically generated for a component. It will be understood that the user interface 400 is illustrative only, and the representation generation system may offer any type of user interface to enable the identification and display of the representations. In some embodiments, the representations are not displayed.

The user interface 400 may further include a first representation 402 and a second representation 404. The first representation 402 may be the same or similar to the first representation 302 as discussed above with respect to FIG. 3. The user interface 400 may further include more, less, or different interfaces. As discussed above, the first representation 402 may be a current or initial representation of the component (e.g., corresponding to a current or initial state of the component), such as before a movement or transition.

The second representation 404 may be a subsequent representation of the component (e.g., a representation of the component at a subsequent time period). The second representation 404 may correspond to a subsequent state of the component (e.g., after the movement or transition) as compared to the current or initial state of the component. For example, the first representation 402 may identify a state of the component during an initial time period and the second representation 404 may identify a state of the component during a subsequent time period.

In some embodiments, a system may generate the first representation 402 and/or the second representation 404 and provide the first representation 402 and/or the second representation 404 for display. In some embodiments, the representations can be used (e.g., by the component) without displaying the representations. As discussed above, the system may obtain state data from the component and generate the first representation 402 such that the first representation 402 represents the initial state of the component. Further, the system may obtain input (e.g., a user input) identifying one or more actions to be taken by the component. For example, the one or more actions may identify elements of the component to be actuated, a route to be navigated by the component, a task to be performed by the component (e.g., opening a door, turning, grasping or picking up an item, taking a picture of an item, docking, etc.). The input may identify a particular state or representation of the component. For example, the input may identify a state for the component to maneuver. In some cases, the input may be an input command.

The first representation 402 and the second representation 404 may each be a visualization of a particular shape. For example, the first representation 402 and the second representation 404 may each be a visualization of polygons. In some cases, one or more of the first representation 402 and the second representation 404 may not directly correspond to a particular state of the component and may correspond to a generalized version of the state of the component (e.g., a representation with reduced complexity as compared to the state of the component).

The representation generation system may obtain the first representation 402 and the second representation 404. As discussed below, the representation generation system may utilize the first representation 402 and the second representation 404 to generate one or more intermediate representations of the component.

In some cases, the user interface 400 may depict a visualization of first representations and second representations of multiple components. For example, the user interface 400 may depict a visualization of first representations and/or second representations for all or a portion of the components within a particular environment.

In the particular example of FIG. 4, the user interface 400 includes a first representation 402 and a second representation 404 that each illustrate a polygon. The first representation 402 includes a polygon with six sides and the second representation 404 illustrates a polygon with eight sides. It will be understood that the first representation 402 and the second representation 404 may include more, less, or different sides. The first representation 402 and the second representation 404 are displayed with respect to a graph (e.g., a graph based on the environment of the component) that identifies x-axis coordinates and y-axis coordinates.

Figure 5:
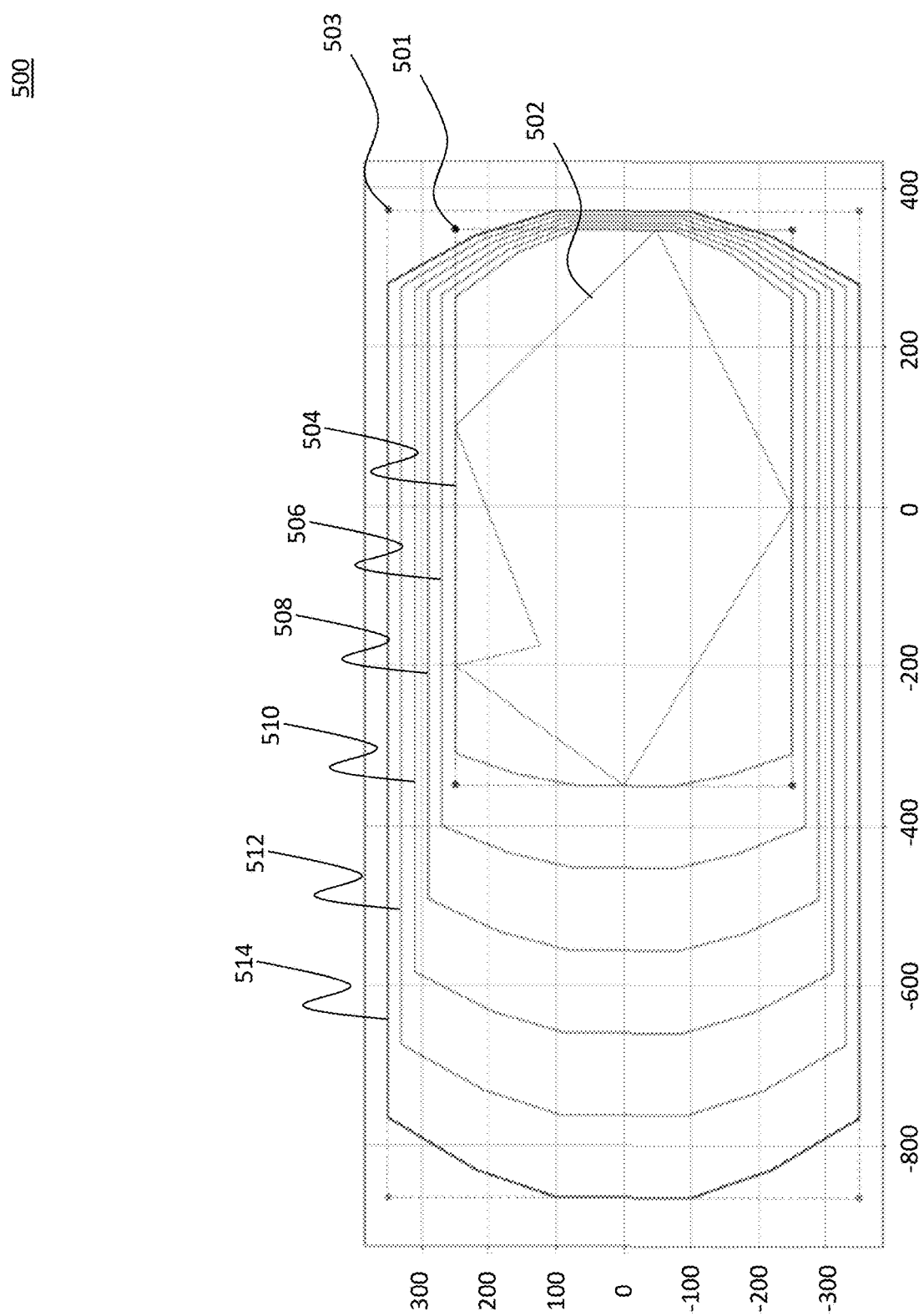
FIG. 5 illustrates a user interface (UI) related to dynamically modifying a representation of a robot, according to some embodiments of the present disclosure.

FIG. 5 depicts an example user interface 500 displaying a visualization of representations of a component including intermediate representations of the component. The example user interface 500 is illustrative of an interface that the representation generation system (or a separate system) can cause to be generated (and presented to a user) for identifying representations dynamically generated for a component. It will be understood that the user interface 500 is illustrative only, and the representation generation system may offer any type of user interface to enable the identification and display of the representations. In some embodiments, the representations are not displayed. The component or system can use the representations, such as for navigation and/or collision avoidance, without displaying the representations to a user.

The user interface 500 may further include a first representation 502 and an associated first bounding box 501, a second representation 514 and an associated second bounding box 503, and intermediate representations 504, 506, 508, 510, 512. The first representation 502 may be the same or similar to the first representation 302 as discussed above with respect to FIG. 3 and/or the first representation 402 as discussed above with respect to FIG. 4. The user interface 500 may further include more, less, or different interfaces. As discussed above, the first representation 502 may be a current or initial representation of the component (e.g., corresponding to a current or initial state of the component), such as before a movement or transition. The second representation 514 may be a subsequent representation of the component (e.g., corresponding to a subsequent state of the component as compared to the current or initial state of the component), such as after the movement or transition. By way of example, the first representation 502 can generally outline the shape or footprint of the component when the arm is in a first position, and the second representation 514 can generally outline the shape or footprint of the component when the arm is in a second position.

All or a portion of the intermediate representations 504, 506, 508, 510, 512 may be intermediate representations between the first representation 502 and the second representation 514. The intermediate representations 504, 506, 508, 510, 512 may identify one or more intermediates states of a component as the component transitions from a first state associated with the first representation 502 to a second state associated with the second representation 514. For example, the intermediate representations can approximate the shape or footprint of the component as the arms moves from the first position to the second position.

To generate the intermediate representations 504, 506, 508, 510, 512, the representation generation system may obtain the first representation 502 and the second representation 514. The representation generation system may generate a scaling factor between the first representation 502 and the second representation 514. In some cases, the representation generation system may generate a first bounding box 501 for all or a portion of the first representation 502 and may generate a second bounding box 503 for all or a portion of the second representation 514. The representation generation system may generate a first bounding box 501 for the first representation 502 and a second bounding box 503 for the second representation 514. The representation generation system may generate the first bounding box 501 and the second bounding box 503 using coordinate values associated with the first representation 502 and the second representation 514. For example, the representation generation system may identify a minimum x-axis value, a maximum x-axis value, a minimum y-axis value, and a maximum y-axis value for the first representation 502 and a minimum x-axis value, a maximum x-axis value, a minimum y-axis value, and a maximum y-axis value for the first representation 502 and the second representation 514. Based on the associated minimum x-axis value, the maximum x-axis value, the minimum y-axis value, and the maximum y-axis value, the representation generation system may generate the first bounding box 501 and the second bounding box 503 such that the first bounding box 501 include a first side based on a minimum x-axis value of the first representation 502, a second side based on a maximum x-axis value of the first representation 502, a third side based on a minimum y-axis value of the first representation 502, and a fourth side based on a maximum y-axis value of the first representation 502. The second bounding box 503 may include a first side based on a minimum x-axis value of the second representation 514, a second side based on a maximum x-axis value of the second representation 514, a third side based on a minimum y-axis value of the second representation 514, and a fourth side based on a maximum y-axis value of the second representation 514. The bounding boxes 501 and 503 can be rectilinear. The bounding boxes 501 and 503 can be rectangles.

The representation generation system may utilize the scaling factor and/or the first bounding box 501 and the second bounding box 503 to scale the second representation 514 (e.g., to produce the first intermediate representation 504). The representation generation system may scale the second representation 514 by scaling one or more coordinates (e.g., x-axis coordinates, y-axis coordinates, etc.) to match the coordinates of the first bounding box 501. For example, the representation generation system may identify a factor to scale the coordinates of the second representation 514 such that the y-axis coordinates of the second representation 514 match (e.g., are equal to) the y-axis coordinates of the first bounding box 501 and/or the x-axis coordinates of the second representation 514 match (e.g., are equal to) the x-axis coordinates of the first bounding box 501. In some cases, the representation generation system may downscale or upscale the second representation 514. Therefore, the representation generation system may scale the second representation 514 to fit within and/or fill the first bounding box 501.

The system can compare the first bounding box 501 to the second bounding box 503 to determine an x-axis scaling factor and a y-axis scaling factor (which can be different than the x-axis scaling factor, such as if the bounding boxes 501 and 503 have different aspect ratios). The second representation 514 can be scaled along the x-axis according to the x-axis scaling factor, and can be scaled in the y-axis according to the y-axis scaling factor. By way of example, the first representation 502 can have a bounding box 501 that has an x-axis length of 100 and a y-axis length of 50 (e.g., for an aspect ratio of 2:1). The second representation 514 can have a bounding box 503 that has an x-axis length of 125 and a y-axis length of 100 (e.g., for an aspect ratio of 1.25:1). The determined x-scaling factor can be 100/125 or 80%, and the determined y-scaling factor can be 50/100 or 50%. So the first intermediate representation 504 can have the same general shape as the second representation 514, but scaled down to 80% in the x-axis and scaled down to 50% in the y-axis, so that the first intermediate representation 504 fit inside the first bounding box 501. If the first bounding box 501 and the second bounding box 503 have the same aspect ratio, then the first intermediate representation 504 can be a similar shape of the second representation 514. In the above example, the first intermediate representation 504 can have a shape that corresponds generally to the second representation, but that is compressed more along the y-axis than along the x-axis. Many variations are possible, such as based on various types of movement by different components (e.g., arms, trays, conveyers, etc.). In some embodiments, the second representation 514 can be scaled in only one axis. In some embodiments, the second representation 514 can be upscaled along a first axis and downscaled along a second axis.

The representation generation system may scale the second representation 514 to generate a first intermediate representation 504, as discussed herein. The first intermediate representation 504 may represent a first intermediate position of the component as it transforms from a first shape associated with the first representation 502 to a second shape associated with the second representation 514. As the first intermediate representation 504 and the first representation 502 are within the same bounding box (e.g., the first bounding box 501), the change from the first representation to the first intermediate representation 504 may be minimal.

To arrive at the second representation 514, the representation generation system may implement one or more subsequent intermediate representations. The number of intermediate representations may be based on a step size or number of steps. In the example of FIG. 5, the number of steps is five, and five intermediate representations 504, 506, 508, 510, and 512) are illustrated. It will be understood that more, less, or different steps may be utilized. The number of steps may be based on the time period for transition between the first state and the second state and the time period for transition between each intermediate representation. The change to the first intermediate representation 504 can occur at the start of the transition, and the changes to the other intermediate representations 506, 508, 510, 512, and/or to the second representation 514 can occur are regular intervals. By way of example, the transition from the first state to the second state can take 0.5 seconds. At time 0, the system can change from the first representation 502 to the first intermediate representation 504. At time 0.1, the system can change to the second intermediate representation 506. At time 0.2, the system can change to the third intermediate representation 508. At time 0.3, the system can change to the fourth intermediate representation 506. At time 0.4, the system can change to the fifth intermediate representation 506. At time 0.5, the system can change to the second representation 514.

To generate the intermediate representations 506, 508, 510, and 512, the representation generation system may incrementally scale the first intermediate representation 504 towards the second representation 514. The representation generation system may determine how much to increase and/or decrease the scale of the shape based on the number of steps. For example, if the representation generation system determines that five steps are to be used to transition from the first intermediate representation 504 to the second representation 514, the representation generation system may scale in 20% increments for each of the later intermediate representations 506, 508, 510, and 512 and for the second representation 514.

By way of example, the second intermediate representation 506 can have a size and/or shape that is 20% scaled from the first intermediate representation 504 to the second representation 514. The third intermediate representation 508 can have a size and/or shape that is 40% scaled from the first intermediate representation 504 to the second representation 514. The fourth intermediate representation 510 can have a size and/or shape that is 60% scaled from the first intermediate representation 504 to the second representation 514. The fifth intermediate representation 512 can have a size and/or shape that is 80% scaled from the first intermediate representation 504 to the second representation 514. The second intermediate representation 506 can have a size and/or shape that is 20% scaled from the first intermediate representation 504 to the second representation 514. The shape can be scaled up to 100% for the second representation 514. If the transition include n steps, the representation can be scaled by increments of 100% divided by n, for each step from the first intermediate representation 504 to the second (e.g., final) representation 514.

In some embodiments, the transition through the steps can be linear, with substantially the same amount of scaling (e.g., 20%) at each substantially equal time interval (e.g., 0.1 seconds). However, in some embodiments, the scaling can be non-linear, such as to reflect non-linear motion of the component. If a component starts moving slowly, and then accelerates to a maximum speed (e.g., in the middle of the transition), and then decelerates to until it is moving relatively slowly at the end of the transition, then the scaling through the intermediate representations can reflect that non-linear motion. For example, rather than scaling the same incremental amount at each step, the system can change the scale by different amounts at different steps. For example, for a 1 second transition, at 0.1 seconds the scaling can be 2%, at 0.2 second the scaling can be 5%, at 0.3 seconds the scaling can be 10%, at 0.4 seconds the scaling can be 25%, at 0.5 seconds the scaling can be 50%, at 0.6 seconds the scaling can be 75%, and at 0.7 seconds the scaling can be 90%, at 0.8 seconds the scaling can be 95%, at 0.9 seconds the scaling can be 98/%, and at 1 second the scaling can be 100% to the second representation.

In the particular example of FIG. 5, the user interface 500 includes the first representation 502, the intermediate representations 504, 506, 508, 510, and 512, and the second representation 514 that each illustrate a polygon. The intermediate representations 504, 506, 508, 510, and 512 may identify a transition between the first representation 502 and the second representation 514. It will be understood that all or a portion of the representations may include more, less, or different sides. The representations are displayed with respect to a graph (e.g., a graph based on the environment of the component) that identifies x-axis coordinates and y-axis coordinates.

Controlling Components Using Intermediate Representations

Figure 6:
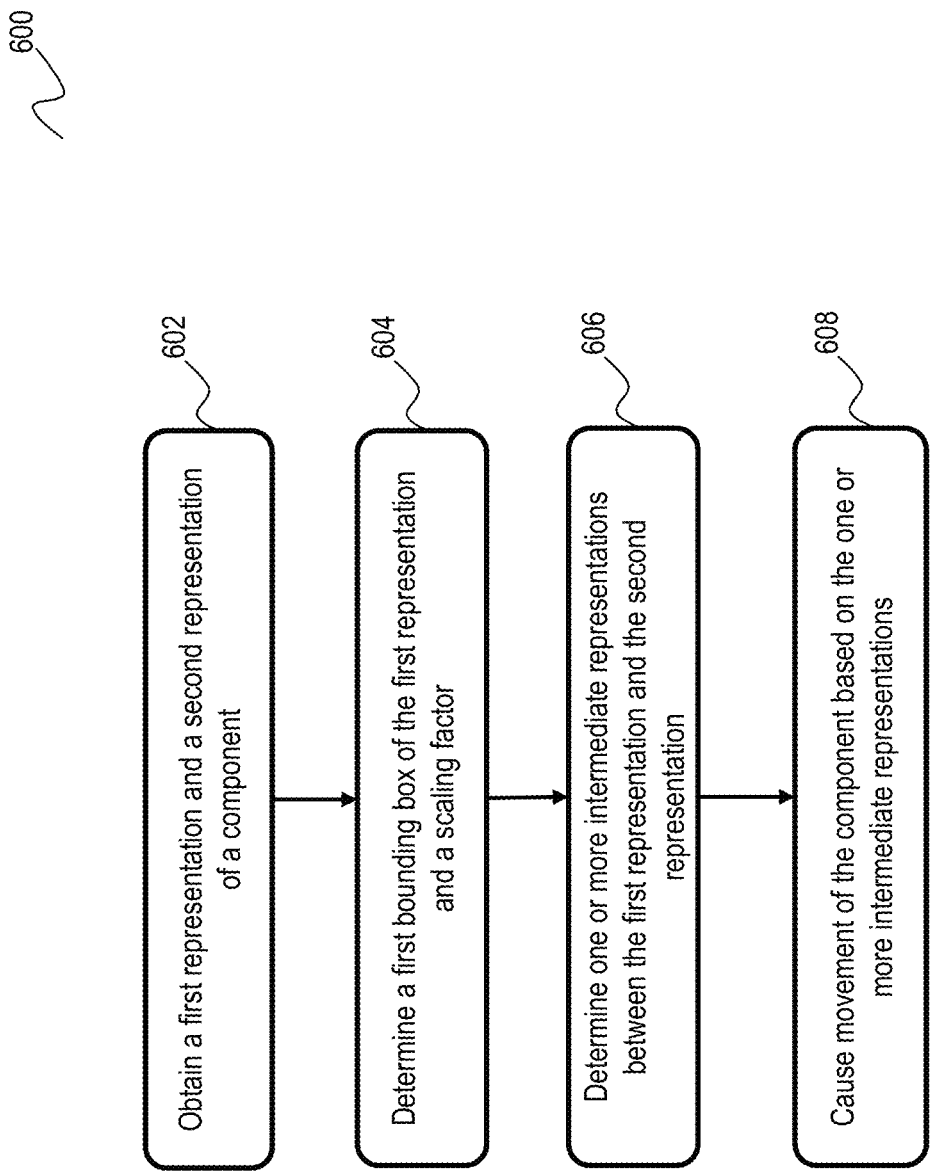
FIG. 6 is a flowchart of an example routine for modifying the representation of a robot according to some embodiments.

FIG. 6 shows a method 600 executed by a representation generation system that generates intermediate representations identifying a transition between a first representation identifying a first state of a component and a second representation identifying a second state of the component, according to some examples of the disclosed technologies. The representation generation system may be similar, for example, to the representation generation system 202 as discussed above, and may include a representation generation component similar to representation generation component 208, memory similar to memory 209, and/or a networking utility similar to networking utility 210.

At block 602, the representation generation system obtains a first representation and a second representation of a component. The component may be a device. For example, the component may be a mobile robot. The first representation may identify an initial or current representation of the component (e.g., before a transition or movement), and the second representation may identify a subsequent representation of the component (e.g., indicating the predicted size and/or shape of the component after the transition or movement). For example, the first representation may indicate a current shape of the component and the second representation may indicate a modified shape of the component. The first representation may include a representation of the component at a first time period and the second representation may include a representation of the component at a second time period subsequent to the first time period.

The first representation may be generated based on data associated with the component (e.g., sensor data), and the second representation may be generated based on data associated with a user computing device (e.g., an input command). The representation generation system may obtain first representation data (e.g., sensor data) from the component and second representation data (e.g., input commands) from the user computing device and generate the first and second representations. In some embodiments, the first representation can be based on a known state of the component based on prior commands or operations. In some embodiments, the second representation can be based on a command or decision to move the component. The second representation can correspond to a predicted future size or shape of the component based on a command or decision to perform a movement or other transition. In some embodiments, the component can be an autonomous robot that can made movement decisions without input from the user.

At block 604, the representation generation system determines a first bounding box of the first representation and a scaling factor between the first representation and the second representation. In some cases, the representation generation system may determine a second bounding box of the second representation. The representation generation system may determine the first bounding box and/or the second bounding box based on coordinates (e.g., x-axis coordinates, y-axis coordinates, etc.) of the first representation and the second representation.

At block 606, the representation generation system determines one or more intermediate representations between the first representation and the second representation. The representation generation system may determine the one or more intermediate representations based on one or more of the scaling factor, the first bounding box, and/or the second bounding box. To generate the first intermediate representation, the representation generation system may scale (e.g., downscale) the second representation to generate a first scaled representation (e.g., the first intermediate representation) that fits within the first bounding box. The representation generation system may scale (e.g., upscale) the first scaled representation to generate a second intermediate representation. The representation generation system may iteratively scale each intermediate representation to generate a subsequent intermediate representation based on the ratio to arrive at a final intermediate representation corresponding to the second representation.

The representation generation system may generate the one or more intermediate representations based on a step size or number of steps. To generate the number of steps, the representation generation system may identify a first time period for transition from the first representation to the second representation, identify a second time period indicating an intermediate representation time period or duration, and identify the number of steps by dividing the first time period by the second time period. For example, the step size may indicate that five intermediate representations are to be generated.

At block 608, the representation generation system causes movement of the component based on the one or more intermediate representations. In some cases, the representation generation system may not cause movement of the component based on the one or more intermediate representations. In some examples, the representation generation system may actively instruct the component to not move or to stop or slow down. In other cases, the representation generation system may cause the component to perform one or more actions based on the one or more intermediate representations. For example, the representation generation system may cause the component to perform collision avoidance and/or obstacle avoidance based on the one or more intermediate representations of the component. The drive system of the component can be operated based at least in part on the one or more intermediate representations disclosed herein, such as to stop, slow down, or proceed along a path. A braking system can be activated based at least in part on the one or more intermediate representations. For example, if the component identifies an object that creates a risk of collision with the intermediate representation, the component can brake to slow down or stop. In some embodiments, movement of the arm or other movable portion of the component (e.g., robot) can be controlled based at least in part on the one or more intermediate representations. For example, the arm or other movable component can be stopped, such as when a risk of collision is determined based on one or more of the intermediate representations.

In some embodiments, the representation generation system (or a navigation or other system) may obtain representations (e.g., intermediate representations) of other components and may cause the component to perform the one or more actions based on the one or more intermediate representations of the component and/or representations of the other components. For example, the representation generation system may cause the component to perform collision avoidance and/or obstacle avoidance based on the one or more intermediate representations of the component and/or representations of the other components.

In some cases, the representation generation system may provide the one or more intermediate representations of the component to other components (e.g., to perform actions such as obstacle avoidance, collision avoidance, etc.). For example, the representation generation system may identify one or more components (e.g., based on a location of the component and the one or more components such that the location of the one or more components is within a particular proximity of the location of the component) and provide the one or more intermediate representations to the one or more components and/or obtain representations of the one or more components from the one or more components.

In some cases, the representation generation system may periodically obtain representations from and/or provide representations from other components. For example, the representation generation system may periodically obtain representations from and/or provide representations to other components based on an identified time period (e.g., a 100 millisecond time period).

The first representation, the second representation, and/or the one or more intermediate representations may include an outline of the component, a shape of the component (e.g., a polygon), a two-dimensional representation of the component, etc. In some embodiments, the first representation, the second representation, and/or the one or more intermediate representations may be software-based representations of the component (e.g., hardware). For example, the first representation, the second representation, and/or the one or more intermediate representations may mimic the shape (e.g., the physical shape) of the component at a particular time period.

In some cases, the representation generation system may cause display of at least one of the first representation, the second representation, or the one or more intermediate representations. For example, the representation generation system may cause display of a representation via a display of a user computing device. In some embodiments, the representation generation system may cause display of a visualization identifying a transformation from the first representation to the one or more intermediate representations and a transformation from the one or more intermediate representations to the second representation.

Although various examples here relate to two-dimensional representations (e.g., having a X dimension and a Y dimension, in other embodiments, the representations can be three-dimensional (e.g., having a X dimension, a Y dimension, and a Z dimension). The bounding boxes can be three-dimensional, and the scaling can be performed in three dimensions rather than in two dimensions.

Additional Information

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Several illustrative examples of modifying a representation of a component have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations.

Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows, Unix, Linux, SunOS, Solaris, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

In summary, various examples of modifying a representation of a component have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above.

What is claimed is:

1. A method for modifying a representation of a robot, the method comprising:
obtaining a first representation of the robot corresponding to a first shape of the robot before a movement transition;
obtaining a second representation of the robot corresponding to a predicted second shape of the robot after the movement transition;
determining a first bounding box for the first representation;
determining a second bounding box for the second representation;
determining a first intermediate representation that has the same general shape as the second representation and scaled to fit within the first bounding box;
determining a plurality of additional intermediate representations that are incrementally scaled between the first intermediate representation and the second representation; and
causing movement of the robot based on one or more of the first representation, the second representation, the first intermediate representation, or an intermediate representation of the plurality of additional intermediate representations.

2. The method of claim 1, further comprising causing display of at least one of the first representation, the second representation, the first intermediate representation, or an intermediate representation of the plurality of additional intermediate representations.

3. The method of claim 1, further comprising causing display of a visualization identifying at least one of a transformation from the first representation to the first intermediate representation, a transformation from the first intermediate representation to the plurality of additional intermediate representations, or a transformation from the plurality of additional intermediate representations to the second representation.

4. The method of claim 1, wherein each of the first representation, the second representation, the first intermediate representation, and the plurality of additional intermediate representations comprises a software representation of the robot.

5. The method of claim 1, wherein the robot comprises an autonomous robot.

6. The method of claim 1, wherein each of the first representation, the second representation, the first intermediate representation, and the plurality of additional intermediate representations comprises a polygon.

7. The method of claim 1, further comprising performing collision avoidance based on the first intermediate representation and the plurality of additional intermediate representations.

8. The method of claim 1, further comprising performing collision avoidance based on the first intermediate representation and the plurality of additional intermediate representations and a plurality of intermediate representations of a second robot.

9. The method of claim 1, further comprising performing obstacle avoidance based on the first intermediate representation and the plurality of additional intermediate representations.

10. The method of claim 1, wherein the first representation is based on data associated with the robot and the second representation is based on data associated with a user computing device.

11. The method of claim 1, further comprising:
obtaining first representation data from the robot;
generating the first representation based on the first representation data;
obtaining second representation data from a user computing device; and
generating the second representation based on the second representation data.

12. The method of claim 1, further comprising providing at least one of the first representation, the second representation, the first intermediate representation, or an intermediate representation of the plurality of additional intermediate representations to a second robot.

13. The method of claim 1, further comprising:
identifying one or more robots based on at least one of a location of the one or more robots or a location of the robot, wherein the location of the one or more robots is within a particular proximity of the location of the robot; and
providing at least one of the first representation, the second representation, the first intermediate representation, or an intermediate representation of the plurality of additional intermediate representations to each of the one or more robots.

14. The method of claim 1, further comprising:
identifying one or more robots based on at least one of a location of the one or more robots or a location of the robot; and
obtaining at least a third representation from each of the one or more robots.

15. The method of claim 1, wherein the plurality of additional intermediate representations comprises five intermediate representations.

16. The method of claim 1, further comprising:
identifying a time period; and
periodically obtaining or providing a representation of a robot based on the time period.

17. The method of claim 1, further comprising:
identifying a first time period for transition from the first representation to the second representation;
identifying a second time period, wherein the second time period indicates an intermediate representation time period;
identifying a number of steps based on the first time period and the second time period; and
generating the one plurality of additional intermediate representations based on the number of steps.

18. The method of claim 1, further comprising:
scaling the first intermediate representation to generate the plurality of additional intermediate representations.

19. A system for modifying a representation of a robot, the system comprising:
one or more processors; and
computer readable memory that includes instructions that are configured to cause the one or more processors to:
obtain a first representation of the robot corresponding to a first shape of the robot before a movement transition;

obtain a second representation of the robot corresponding to a predicted second shape of the robot after the movement transition;

determine a first bounding box for the first representation;

determine a second bounding box for the second representation;

determine a first intermediate representation that has the same general shape as the second representation and scaled to fit within the first bounding box;

determine a plurality of additional intermediate representations that are incrementally scaled between the first intermediate representation and the second representation; and cause movement of the robot based on one or more of the first representation, the second representation, the first intermediate representation, or an intermediate representation of the plurality of additional intermediate representations.

* * * * *